(12) United States Patent
Krause et al.

(10) Patent No.: US 10,014,975 B2
(45) Date of Patent: Jul. 3, 2018

(54) CHANNEL CARRYING MULTIPLE DIGITAL SUBCARRIERS

(71) Applicant: Infinera Corporation, Sunnyvale, CA (US)

(72) Inventors: David James Krause, Nepean (CA); Han Sun, Ottawa (CA); Yuejian Wu, Kanata (CA); John D. McNicol, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 584 days.

(21) Appl. No.: 13/630,630

(22) Filed: Sep. 28, 2012

(65) Prior Publication Data
US 2014/0092924 A1    Apr. 3, 2014

(51) Int. Cl.
*H04J 3/04*    (2006.01)
*H04J 14/02*    (2006.01)

(52) U.S. Cl.
CPC .......... *H04J 14/0298* (2013.01); *H04J 14/02* (2013.01)

(58) Field of Classification Search
CPC .............................. H04J 14/0298; H04J 14/02
See application file for complete search history.

(56) References Cited

U.S. PATENT DOCUMENTS

| | | | | |
|---|---|---|---|---|
| 6,525,857 B1* | 2/2003 | Way | ........................ | H04B 10/50 398/132 |
| 2002/0005971 A1* | 1/2002 | Sasai | ...................... | H04B 10/58 398/147 |
| 2002/0034191 A1* | 3/2002 | Shattil | ....................... | H04L 1/04 370/464 |
| 2002/0067883 A1* | 6/2002 | Lo | ........................ | H04B 10/532 385/24 |

(Continued)

OTHER PUBLICATIONS

Greshishchev et al., "A 56GS/s 6b DAC in 65nm CMOS with 256x6b Memory", ISSCC 2011/Session 10/Nyquist-Rate Converters/10.8, 2011 IEEE International Solid-State Circuits Conference, 3 pages.

(Continued)

*Primary Examiner* — Gregory Sefcheck
*Assistant Examiner* — Jael Ulysse
(74) *Attorney, Agent, or Firm* — Harrity & Harrity LLP; David L. Soltz

(57) ABSTRACT

An optical system includes a transmitter module and/or a receiver module. The transmitter module is configured to receive input data, map the input data to a set of subcarriers associated with an optical communication channel, independently apply spectral shaping to each of the subcarriers, generate input values based on the spectral shaping of each of the subcarriers, generate voltage signals based on the input values, modulate light based on the voltage signals to generate an output optical signal that includes the subcarriers, and output the output optical signal. The receiver (Continued)

module is configured to receive the output optical signal, convert the output optical signal to a set of voltage signals, generate digital samples based on the set of voltage signals, independently process the digital samples for each of the subcarriers, map the processed digital samples to produce output data, and output the output data.

24 Claims, 12 Drawing Sheets

(56) References Cited

U.S. PATENT DOCUMENTS

| | | | | |
|---|---|---|---|---|
| 2002/0114038 A1* | 8/2002 | Arnon | H04B 10/1125 | 398/115 |
| 2003/0223751 A1* | 12/2003 | Shimizu | H04J 14/0221 | 398/79 |
| 2004/0019459 A1* | 1/2004 | Dietz | G01M 11/335 | 702/184 |
| 2004/0151109 A1* | 8/2004 | Batra | H04B 1/7163 | 370/208 |
| 2004/0197103 A1* | 10/2004 | Roberts | H04B 10/2543 | 398/159 |
| 2004/0198265 A1* | 10/2004 | Wallace | H04B 7/0857 | 455/118 |
| 2005/0008085 A1* | 1/2005 | Lee | H04L 5/006 | 375/260 |
| 2005/0074037 A1* | 4/2005 | Rickard | H04J 14/0298 | 370/537 |
| 2005/0111789 A1* | 5/2005 | Hayes | H04J 14/02 | 385/27 |
| 2005/0175112 A1* | 8/2005 | Pisoni | H04B 3/23 | 375/260 |
| 2005/0175339 A1* | 8/2005 | Herskowits | H04B 10/25073 | 398/1 |
| 2006/0093052 A1* | 5/2006 | Cho | H04L 27/263 | 375/260 |
| 2006/0215540 A1* | 9/2006 | Krishnamoorthi | H04L 27/2644 | 370/208 |
| 2006/0233147 A1* | 10/2006 | Karabinis | H04J 1/12 | 370/342 |
| 2007/0004465 A1* | 1/2007 | Papasakellariou | H04W 52/325 | 455/571 |
| 2007/0025421 A1* | 2/2007 | Shattil | H04B 10/25752 | 375/136 |
| 2008/0085125 A1* | 4/2008 | Frankel | H04B 10/0795 | 398/159 |
| 2009/0092389 A1* | 4/2009 | Wei | H04J 14/0241 | 398/59 |
| 2009/0154336 A1* | 6/2009 | Green | H04L 5/0044 | 370/210 |
| 2009/0190929 A1* | 7/2009 | Khurgin | H04B 10/61 | 398/79 |
| 2009/0214224 A1* | 8/2009 | Cho | H04B 10/61 | 398/188 |
| 2009/0232234 A1* | 9/2009 | Du | H04B 7/2621 | 375/260 |
| 2009/0257344 A1* | 10/2009 | Huang | H04L 27/2697 | 370/210 |
| 2010/0021163 A1* | 1/2010 | Shieh | H04B 10/60 | 398/65 |
| 2010/0086303 A1* | 4/2010 | Qian | H04J 14/06 | 398/65 |
| 2010/0178057 A1* | 7/2010 | Shieh | H04L 25/0224 | 398/79 |
| 2011/0135301 A1* | 6/2011 | Myslinski | H04B 10/572 | 398/34 |
| 2011/0176813 A1* | 7/2011 | Kim | H04B 10/516 | 398/147 |
| 2011/0182577 A1* | 7/2011 | Wu | H04B 10/2513 | 398/52 |
| 2011/0249978 A1* | 10/2011 | Sasaki | H04J 14/02 | 398/140 |
| 2011/0255870 A1* | 10/2011 | Grigoryan | H04B 10/548 | 398/65 |
| 2012/0002703 A1* | 1/2012 | Yamashita | H04L 5/0044 | 375/133 |
| 2012/0033965 A1* | 2/2012 | Zhang | H04B 10/611 | 398/38 |
| 2012/0093510 A1* | 4/2012 | Zhang | H04B 10/5561 | 398/65 |
| 2012/0141135 A1* | 6/2012 | Yang | H04B 10/516 | 398/140 |
| 2012/0251121 A1* | 10/2012 | McNicol | H04J 14/02 | 398/91 |
| 2013/0070786 A1* | 3/2013 | Liu | C02F 1/78 | 370/464 |
| 2014/0010543 A1* | 1/2014 | Lee | | 398/79 |

OTHER PUBLICATIONS

Bingham, "Multicarrier Modulation for Data Transmission: An Idea Whose Time Has Come", IEEE Communications Magazine, pp. 5-14, May 1990, 8 pages.

Yan et al., "Experimental Comparison of No-Guard-Interval-OFDM and Nyquist-WDM Superchannels", OFC/NFOEC Technical Digest, Jan. 23, 2012, 4 pages.

Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.

Sun et al., "Real-Time Measurements of a 40 Gb/s Coherent System", Jan. 21, 2008, vol. 16, No. 2, Optics Express, pp. 873-879.

Zhang et al., "3760km, 100G SSMF Transmission over Commercial Terrestrial DWDM ROADM Systems using SD-FEC", OFC/NFOEC Postdeadline Papers, Mar. 2012, 3 pages.

Rahn et al., "Real-Time PIC-based Super-Channel Transmission Over a Gridless 6000km Terrestrial Link", OFC/NFOEC Postdeadline Papers, Mar. 2012, 3 pages.

* cited by examiner

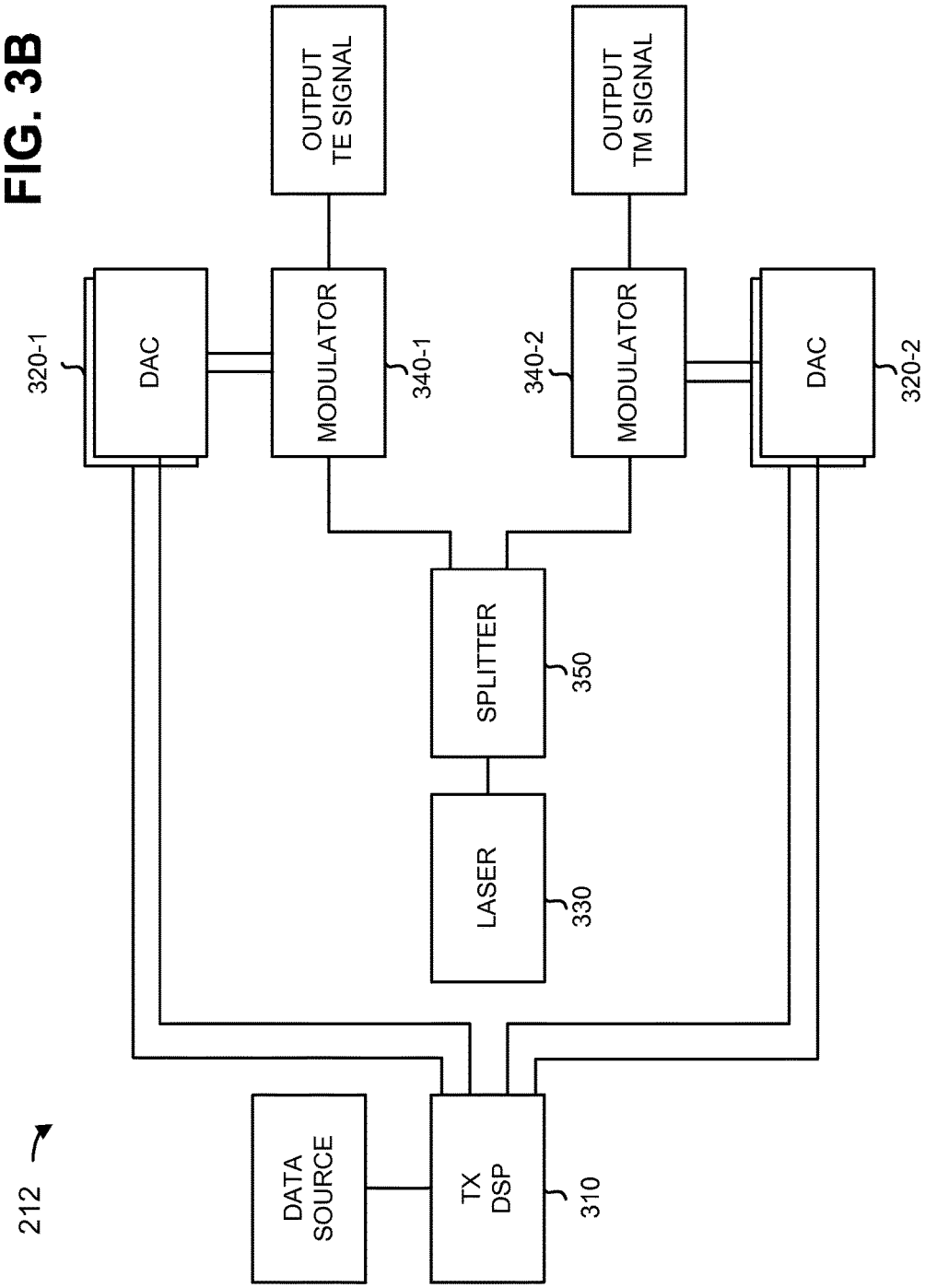

CHANNEL CARRYING MULTIPLE DIGITAL SUBCARRIERS

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, or various polymers and semiconductor materials which are used to make semiconductor lasers, such as GaAs and InP.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs. The spacing, between the channels, may be less than 200 GHz, in order to tightly pack the channels together to form a super channel.

SUMMARY

According to some example implementations, an optical system may include a transmitter module. The transmitter module may include a processor, a digital-to-analog converter, a laser, and a modulator. The processor may receive input data, map the input data to a set of subcarriers associated with an optical communication channel, independently apply spectral shaping to each of the subcarriers, and generate input values based on the spectral shaping of each of the subcarriers. The digital-to-analog converter may receive the input values from the processor, and generate voltage signals based on the input values. The laser may output light. The modulator may receive the light from the laser and the voltage signals from the digital-to-analog converter, modulate the light based on the voltage signals to generate an output optical signal that includes the subcarriers, and output the output optical signal.

According to some example implementations, an optical system may include a receiver module. The receiver module may include a detector, an analog-to-digital converter, and a processor. The detector may receive a particular optical signal that includes a set of subcarriers associated with an optical communication channel, and convert the particular optical signal to a set of voltage signals. The analog-to-digital converter may receive the set of voltage signals from the detector, and generate digital samples based on the set of voltage signals. The processor may receive the digital samples from the analog-to-digital converter, independently process the digital samples for each of the subcarriers, map the processed digital samples to produce output data, and output the output data.

According to some example implementations, an optical system may include a receiver module. The receiver module may include a demultiplexer and a set of receiver components. The demultiplexer may receive a particular optical signal that includes a set of subcarriers associated with an optical communication channel, and separate the particular optical signal into a set of optical signals. Each of the set of optical signals corresponds to one or more of the set of subcarriers. One of the receiver components may include a detector, an analog-to-digital converter, and a processor. The detector may receive one of the optical signals, and convert the optical signal to a set of voltage signals. The analog-to-digital converter may receive the set of voltage signals from the detector, and generate digital samples based on the set of voltage signals. The processor may receive the digital samples from the analog-to-digital converter, independently process the digital samples for each of one or more of the set of subcarriers, map the processed digital samples to produce output data, and output the output data.

According to some example implementations, an optical system may include a transmitter module and a receiver module. The transmitter module may receive input data, map the input data to a set of subcarriers associated with an optical communication channel, independently apply spectral shaping to each of the subcarriers, generate input values based on the spectral shaping of each of the subcarriers, generate voltage signals based on the input values, modulate light based on the voltage signals to generate an output optical signal that includes the subcarriers, and output the output optical signal. The receiver module may receive the output optical signal, convert the output optical signal to a set of voltage signals, generate digital samples based on the set of voltage signals, independently process the digital samples for each of the subcarriers, map the processed digital samples to produce output data, and output the output data.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3B is a diagram illustrating another example of components of an optical transmitter shown in FIG. 2;

DETAILED DESCRIPTION

The following detailed description refers to the accompanying drawings. The same reference numbers in different drawings may identify the same or similar elements. Also, the following detailed description does not limit the disclosure.

Figure 1:
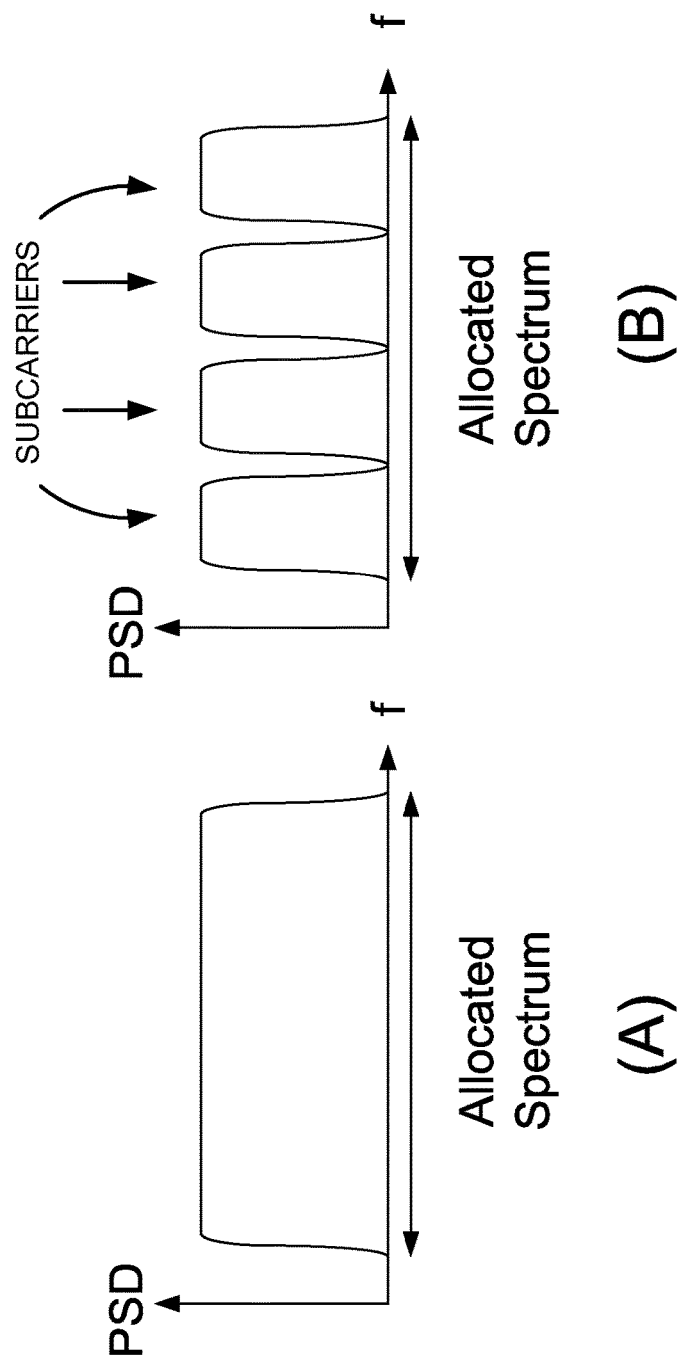
FIG. 1 is a diagram illustrating an overview of an example implementation described herein.

FIG. 1 is a diagram illustrating an overview of an example implementation described herein. In an optical communication system, a certain bandwidth, or spectrum, may be allocated to an optical communications channel. As shown in (A), the channel may include a single carrier. In the implementation of (A), data may be mapped to a pulse of a desired spectral shape. In the implementation of (A), the pulse may be designed to fill the entire spectrum.

A system and method, as described herein, may use digital-to-analog converters to generate multiple subcarriers. As shown in (B), rather than including a single carrier, the channel may include multiple subcarriers. The quantity of subcarriers may be a design decision that may be based on properties of the laser and/or other optical components being used. In the implementation of (B), data may be mapped to a respective one of the multiple subcarriers. As described in further detail below, each subcarrier may be independently generated and processed by the same transmitter.

The use of high speed digital-to-analog converters (DACs) and analog-to-digital converters (ADCs) (e.g., 64 GSample/s and beyond) may reduce the computational complexity of both the transmitter and the receiver. The high speed DACs and ADCs may facilitate the tuning of the output signal given design characteristics of the lasers and the modulators, and the available power budget. According to some implementations, a transmitter may be designed with a DSP, DACs, and electro-optical conversion (e.g., a laser and a modulator), and a receiver may be designed with receiver optics (e.g., a hybrid mixer and a local oscillator), ADCs, and a DSP. Such a transmitter may generate one or more subcarriers, and such a receiver may detect the one or more subcarriers. For example, if 32 GHz of optical spectrum is available for a channel, then the transmitter might generate one subcarrier of 32 Gbaud, two subcarriers of 16 Gbaud, three subcarriers of 10.66 Gbaud, and so on. The subcarriers may be designed so that the subcarriers can be substantially encoded and decoded separately.

The multiple subcarrier approach may have several advantages. For example, digital filters, for the multiple subcarrier approach, may include fewer taps than existing approaches. For equal dispersion, a higher baud rate requires more taps than a lower baud rate. For example, a 40 Gbaud system may need approximately 2800 baud of taps, while a 10 Gbaud system may need approximately 180 baud of taps for 200,000 picoseconds per nanometer (ps/nm). The multiple subcarrier approach may reduce the penalty due to the combination of a receiver laser linewidth and electronic dispersion compensation because of the flexibility in choosing the baud rate of the subcarriers. The multiple subcarrier approach may also permit bit error rate (BER) averaging over the subcarriers, which can lead to performance benefits. The multiple subcarrier approach may also reduce power consumption over existing approaches.

Figure 2:
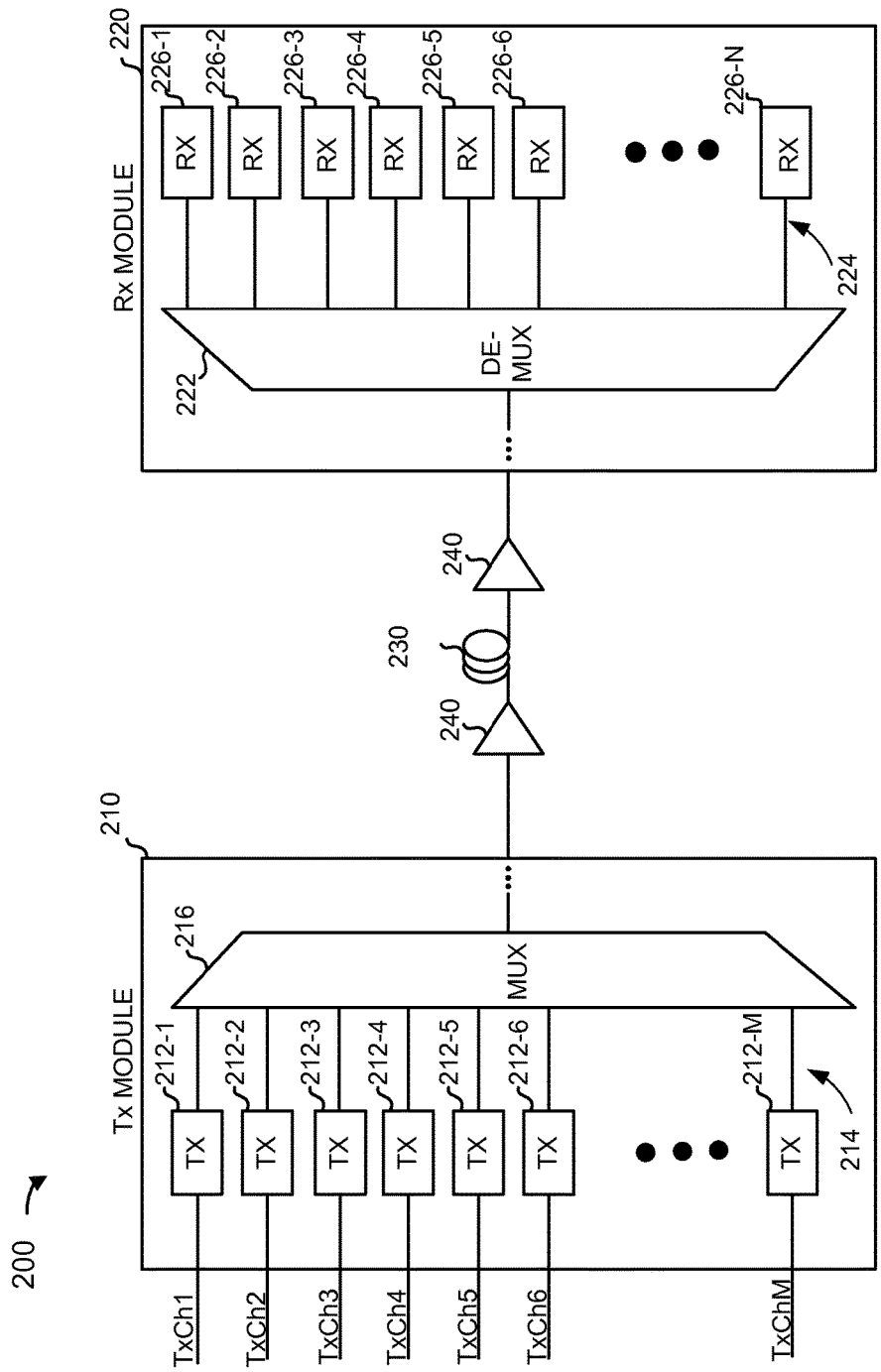
FIG. 2 is a diagram of an example network in which systems and/or methods, described herein, may be implemented.

FIG. 2 is a diagram of an example network 200 in which systems and/or methods described herein may be implemented. As illustrated in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components.

Each optical transmitter 212 may receive data for a data channel (shown as TxCh1 through TxChM), create multiple subcarriers for the data channel, map data, for the data channel, to the multiple subcarriers, modulate the data with an optical signal to create a multiple subcarrier output optical signal, and transmit the multiple subcarrier output optical signal. In one implementation, transmitter module 210 may include 5, 10, 20, 50, 100, or some other quantity of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super channel.

In some implementations and as described above, each of optical transmitters 212 may include a TX DSP, a DAC, a laser, a modulator, and/or some other components. The laser and/or the modulator may be coupled with a tuning element that can be used to tune the wavelength of the optical signal channel.

Waveguides 214 may include an optical link or some other link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexer device. In some implementations, optical multiplexer 216 may combine multiple output optical signals, associated with optical transmitters 212, into a single optical signal (e.g., a WDM signal). In some implementations, optical multiplexer 216 may combine multiple output optical signals, associated with optical transmitters 212, in such a way as to produce a polarization diverse signal (e.g., also referred to herein as a WDM signal). A corresponding waveguide may output the WDM signal on an optical fiber, such as link 230. For example, optical multiplexer 216 may include an input (e.g., a first slab to receive input optical signals supplied by optical transmitters 212) and an output (e.g., a second slab to supply a single WDM signal associated with the input optical signals). Optical multiplexer 216 may also include waveguides connected to the input and the output.

In some implementations, the first slab and the second slab may each act as an input and an output. For example, the first slab and the second slab may each receive multiple input optical signals (e.g., output optical signals supplied by optical transmitters 212). Additionally, the first slab may supply a single WDM signal corresponding to the input optical signals (e.g., output optical signals supplied by optical transmitters 212) received by the second slab. Further, the second slab may supply a single WDM signal corresponding to the input optical signals (e.g., output optical signals supplied by optical transmitters 212) received by the first slab. In some implementations, a corresponding waveguide may output the WDM signal on an optical fiber, such as link 230.

As shown in FIG. 2, optical multiplexer 216 may receive output optical signals outputted by optical transmitters 212, and output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 230 may include an optical fiber. Link 230 may transport one or more optical signals associated with multiple wavelengths. Amplifier 240 may include an amplification device, such as a doped fiber amplifier or a Raman amplifier. Amplifier 240 may amplify the optical signals as the optical signals are transmitted via link 230.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other demultiplexer device. Optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the first slab and the second slab.

In some implementations, the first slab and the second slab may each act as an input and an output. For example, the first slab and the second slab may each receive an optical signal (e.g., a WDM signal supplied by optical multiplexer 216 and/or some other optical signal). Additionally, the first slab may supply output optical signals corresponding to the optical signal received by the second slab. Further, the second slab may supply output optical signals corresponding to the optical signal received by the first slab. As shown in FIG. 2, optical demultiplexer 222 may supply optical signals to optical receivers 226 via waveguides 224.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, detect the subcarriers associated with the input optical signals, convert data within the subcarriers to a voltage signals, convert the voltage signals to digital samples, and process the digital samples to produce output data corresponding to the input optical signals. Optical receivers 226 may each operate to convert the input optical signal to an electrical signal that represents the transmitted data. In some implementations and as described above, each of optical receivers 226 may include a local oscillator, a hybrid mixer, a detector, an ADC, an RX DSP, and/or some other components.

While FIG. 2 shows network 200 as including a particular quantity and arrangement of components, in some implementations, network 200 may include additional components, fewer components, different components, or differently arranged components. Also, in some instances, one of the devices illustrated in FIG. 2 may perform a function described herein as being performed by another one of the devices illustrated in FIG. 2.

Figure 3A:
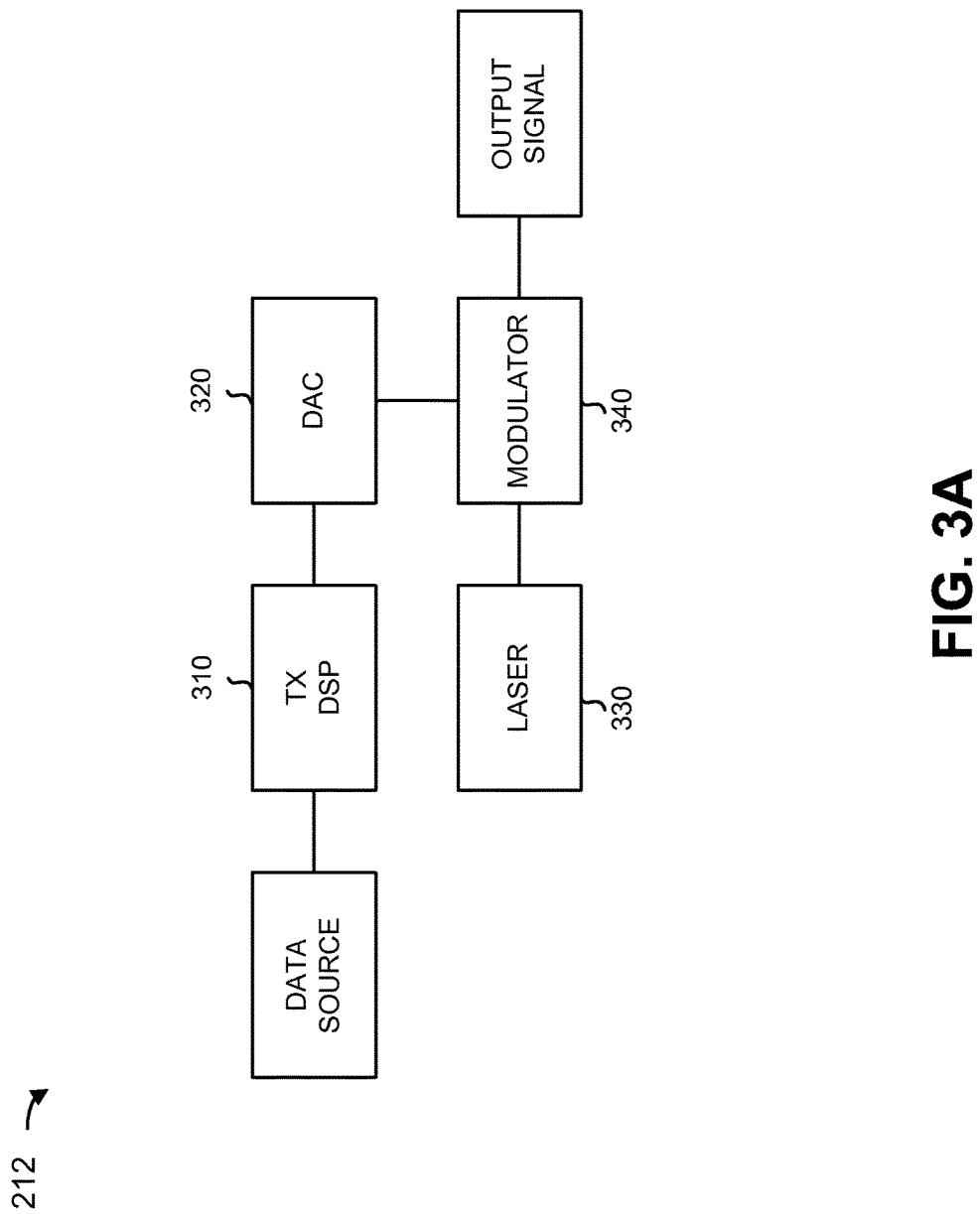
FIG. 3A is a diagram illustrating an example of components of an optical transmitter shown in FIG. 2.

FIG. 3A is a diagram illustrating an example of components of an optical transmitter 212. As shown in FIG. 3A, optical transmitter 212 may include a TX DSP 310, a DAC 320, a laser 330, and a modulator 340. In some implementations, TX DSP 310 and DAC 320 may be implemented using an application specific integrated circuit (ASIC) and/or may be implemented on a single integrated circuit, such as a single PIC. In some implementations, laser 330 and modulator 340 may be implemented on a single integrated circuit, such as a single PIC. In some other implementations, TX DSP 310, DAC 320, laser 330, and/or modulator 340 may be implemented on one or more integrated circuits, such as one or more PICs. For example, in some example implementations, components of multiple optical transmitters 212 may be implemented on a single integrated circuit, such as a single PIC, to form a super-channel transmitter.

TX DSP 310 may include a digital signal processor. TX DSP 310 may receive input data from a data source, and determine the signal to apply to modulator 340 to generate multiple subcarriers. In some implementations, TX DSP 310 may receive streams of data, map the streams of data into each of the subcarriers, independently apply spectral shaping to each of the subcarriers, and obtain, based on the spectral shaping of each of the subcarriers, a sequence of assigned integers to supply to DAC 320. In some implementations, TX DSP 310 may generate the subcarriers using time domain filtering and frequency shifting by multiplication in the time domain.

DAC 320 may include a digital-to-analog converter. DAC 320 may receive the sequence of assigned integers and, based on the sequence of assigned integers, generate the voltage signals to apply to modulator 340.

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple subcarrier output signal.

While FIG. 3A shows optical transmitter 212 as including a particular quantity and arrangement of components, in some implementations, optical transmitter 212 may include additional components, fewer components, different components, or differently arranged components. The quantity of DACs 320, lasers 330, and/or modulators 340 may be selected to implement an optical transmitter 212 that is capable of generating polarization diverse signals for transmission on an optical fiber, such as link 230. In some instances, one of the components illustrated in FIG. 3A may perform a function described herein as being performed by another one of the components illustrated in FIG. 3A.

FIG. 3B is a diagram illustrating another example of components of an optical transmitter 212. As shown in FIG. 3B, optical transmitter 212 may include a TX DSP 310, DACs 320-1 and 320-2 (referred to generally as DACs 320 and individually as DAC 320), a laser 330, modulators 340-1 and 340-2 (referred to generally as modulators 340 and individually as modulator 340), and splitter 350. TX DSP 310, DACs 320, laser 330, and modulators 340 may correspond to like components described with regard to FIG. 3A.

Splitter 350 may include an optical splitter that receives the optical light beam from laser 330 and splits the optical light beam into two branches: one for the first polarization and one for the second polarization. In some implementations, the two optical light beams may have approximately equal power. Splitter 350 may output one optical light beam to modulator 340-1 and another optical light beam to modulator 340-2.

Modulator 340-1 may be used to modulate signals of the first polarization. Modulator 340-2 may be used to modulate signals of the second polarization. In some implementations, two DACs 320 may be associated with each polarization. In these implementations, two DACs 320-1 may supply voltage signals to modulator 340-1, and two DACs 320-2 may supply voltage signals to modulator 340-2. The outputs of modulators 340 may be combined back together using combiners (e.g., optical multiplexer 216) and polarization multiplexing.

While FIG. 3B shows optical transmitter 212 as including a particular quantity and arrangement of components, in some implementations, optical transmitter 212 may include additional components, fewer components, different components, or differently arranged components. The quantity of DACs 320, lasers 330, and/or modulators 340 may be selected to implement an optical transmitter 212 that is capable of generating polarization diverse signals for transmission on an optical fiber, such as link 230. In some instances, one of the components illustrated in FIG. 3B may perform a function described herein as being performed by another one of the components illustrated in FIG. 3B.

Figure 4:
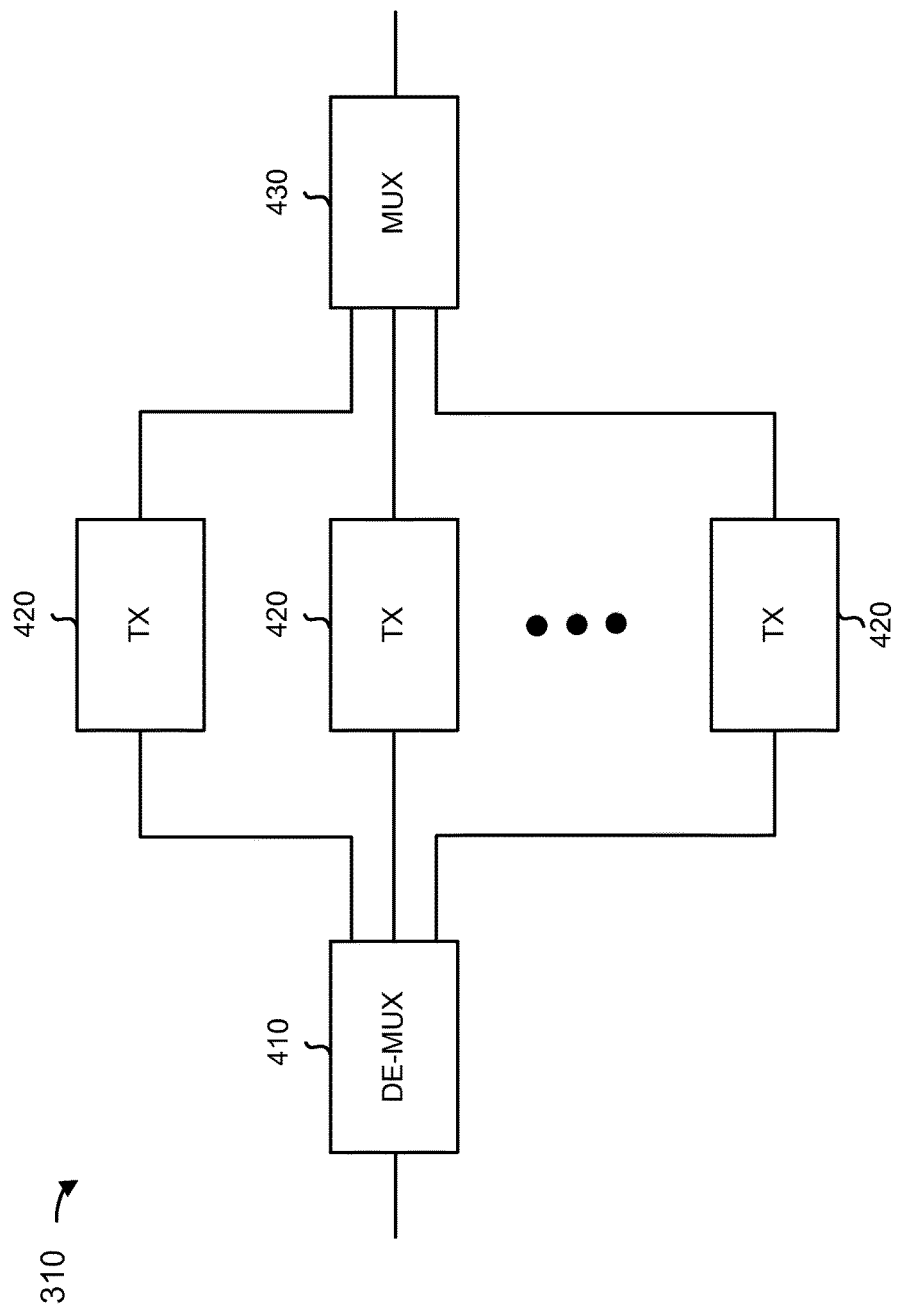
FIG. 4 is a diagram illustrating example components of a transmitter digital signal processor (DSP) shown in FIG. 3A or 3B.

FIG. 4 is a diagram illustrating example components of TX DSP 310. As shown in FIG. 4, TX DSP 310 may include a demultiplexer (DE-MUX) 410, multiple transmitter components 420, and a multiplexer (MUX) 430.

Demultiplexer 410 may include a demultiplexer device. Demultiplexer 410 may receive a stream of data from a data source, and may demultiplex the data for presentation to transmitter components 420. In some implementations, demultiplexer 410 may separate the data for the multiple subcarriers.

Transmitter components 420 may correspond to a set of Z ($Z \geq 1$) transmitter components 420, which may correspond to Z subcarriers. In other words, each transmitter component 420 may process data for inclusion on a corresponding subcarrier. Each transmitter component 420 may apply pulse shaping (e.g., spectral shaping), channel correction (e.g., dispersion compensation), and the like. The pulse shaping may provide fast roll-off of the spectrum of the subcarriers, which in turn permits the subcarriers to be packed tightly.

Error correction may be applied to the data. In some implementations, coding for error correction, such as forward error correction (FEC) coding, may be applied at the data source. In some implementations, coding for error correction, such as FEC coding, may be applied at transmitter components 420.

Multiplexer 430 may include a multiplexer device. Multiplexer 430 may receive data for each subcarrier from transmitter components 420, and may combine the data to form a sequence of integers for output to DAC 320 for production of the appropriate voltage signals.

In some implementations, demultiplexer 410, transmitter components 420, and/or multiplexer 430 may apply timing skew to each of the multiple subcarriers to correct for skew induced by link 230.

While FIG. 4 shows TX DSP 310 as including a particular quantity and arrangement of components, in some implementations, TX DSP 310 may include additional components, fewer components, different components, or differently arranged components. Also, in some instances, one of the components illustrated in FIG. 4 may perform a function described herein as being performed by another one of the components illustrated in FIG. 4.

Figure 5:
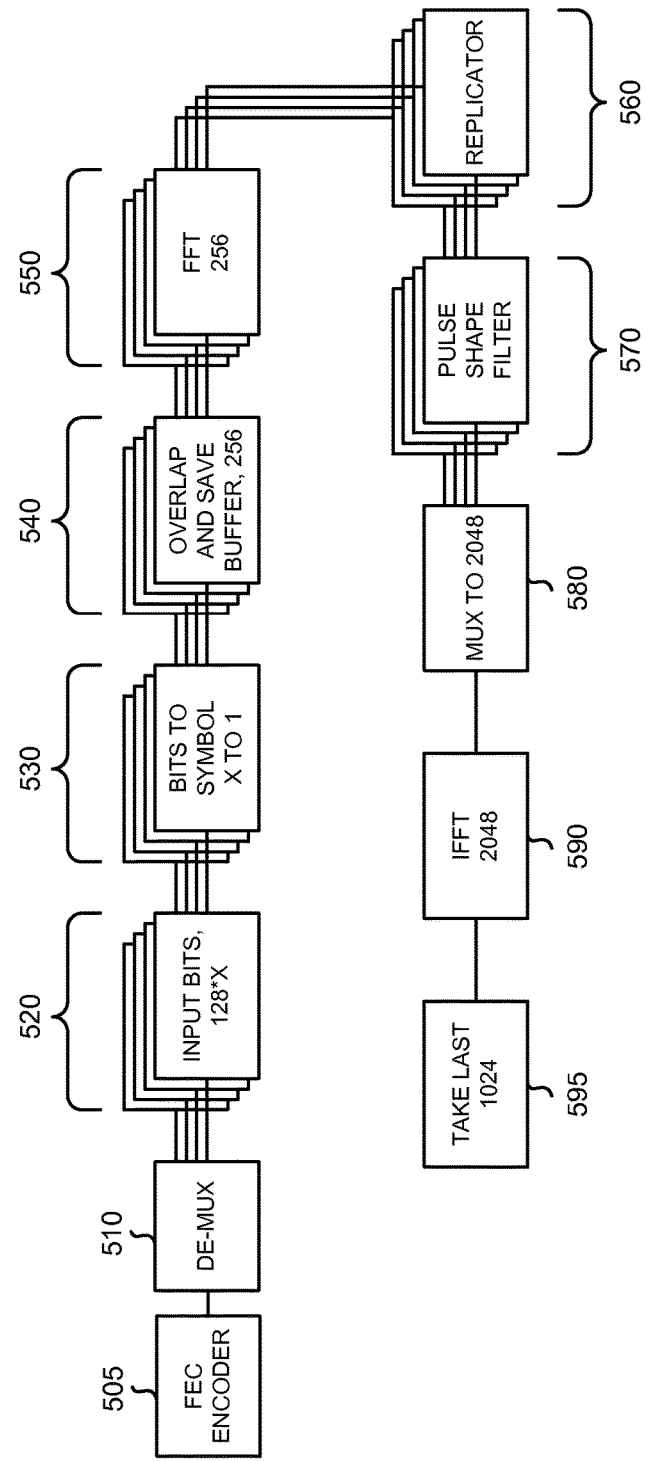
FIG. 5 is a diagram illustrating example functional components of a transmitter DSP shown in FIG. 3A or 3B.

FIG. 5 is a diagram illustrating example functional components of TX DSP 310. The particular functional components, which may be included in TX DSP 310, may vary based on desired performance characteristics and/or computational complexity. For the particular functional components shown in FIG. 5, assume that TX DSP 310 is connected to a 64 GSample/s DAC 320 and produces four subcarriers of eight Gbaud. In this case, TX DSP 310 may include four transmitter components 420—one for each subcarrier. TX DSP 310 may include different functional components or a different quantity of functional components in other situations.

As shown in FIG. 5, TX DSP 310 may include an FEC encoder 505, a de-mux component 510, an input bits component 520, a bits to symbol component 530, an overlap and save buffer 540, a fast Fourier transform functions (FFT) component 550, a replicator component 560, a pulse shape filter 570, a mux component 580, an inverse FFT (IFFT) component 590, and a take last 1024 component 595.

FEC encoder 505 may receive an input stream of bits and perform error correction coding, such as through the addition of parity bits. De-mux component 510 may receive the stream of bits of data and perform a demultiplexing operation on the stream of bits. In this example, de-mux component 510 may separate the stream of bits into groups of bits associated with the four subcarriers. In some implementations, the bits could be separately or jointly encoded for error correction in de-mux component 510, using forward error correction. De-mux component 510 may use the error correction encoding to separate the bits for the different subcarriers. De-mux component 510 may be designed to systematically interleave bits between the subcarriers. De-mux component 510 may be designed to generate timing skew between the subcarriers to correct for skew induced by link 230. De-mux component 510 may provide each group of bits to a corresponding input bits component 520. Input bits component 520 may process 128*X bits at a time, where X is an integer. For dual-polarization Quadrature Phase Shift Keying (QPSK), X would be four.

Bits to symbol component 530 may map the bits to symbols on the complex plane. For example, bits to symbol component 530 may map four bits to a symbol in the dual-polarization QPSK constellation. Overlap and save buffer 540 may buffer 256 symbols. Overlap and save buffer 540 may receive 128 symbols at a time from bits to symbol component 530. Thus, overlap and save buffer 540 may combine 128 new symbols, from bits to symbol component 530, with the previous 128 symbols received from bits to symbol component 530.

FFT component 550 may receive 256 symbols from overlap and save buffer 540 and convert the symbols to the frequency domain using, for example, a fast Fourier transform (FFT). FFT component 550 may form 256 frequency bins as a result of performing the FFT. Replicator component 560 may replicate the 256 frequency bins to form 512 frequency bins (e.g., for T/2 based filtering of the subcarrier). This replication may increase the sample rate.

Pulse shape filter 570 may apply a pulse shaping filter to the 512 frequency bins. The purpose of pulse shape filter 570 is to calculate the transitions between the symbols and the desired spectrum so that the subcarriers can be packed together on the channel. Pulse shape filter 570 may also be used to introduce timing skew between the subcarriers to correct for timing skew induced by link 230. Mux component 580 may receive all four, eight Gbaud subcarriers (from the four pulse shape filters 570) and multiplex them together to form a 2048 element vector.

IFFT component 590 may receive the 2048 element vector and return the signal back to the time domain, which may now be at 64 GSample/s. IFFT component 590 may convert the signal to the time domain using, for example, an inverse fast Fourier transform (IFFT). Take last 1024 component 595 may select the last 1024 samples from IFFT component 590 and output the 1024 samples to DAC 320 at 64 GSample/s.

While FIG. 5 shows TX DSP 310 as including a particular quantity and arrangement of functional components, in some implementations, TX DSP 310 may include additional functional components, fewer functional components, different functional components, or differently arranged functional components.

Figure 6A:
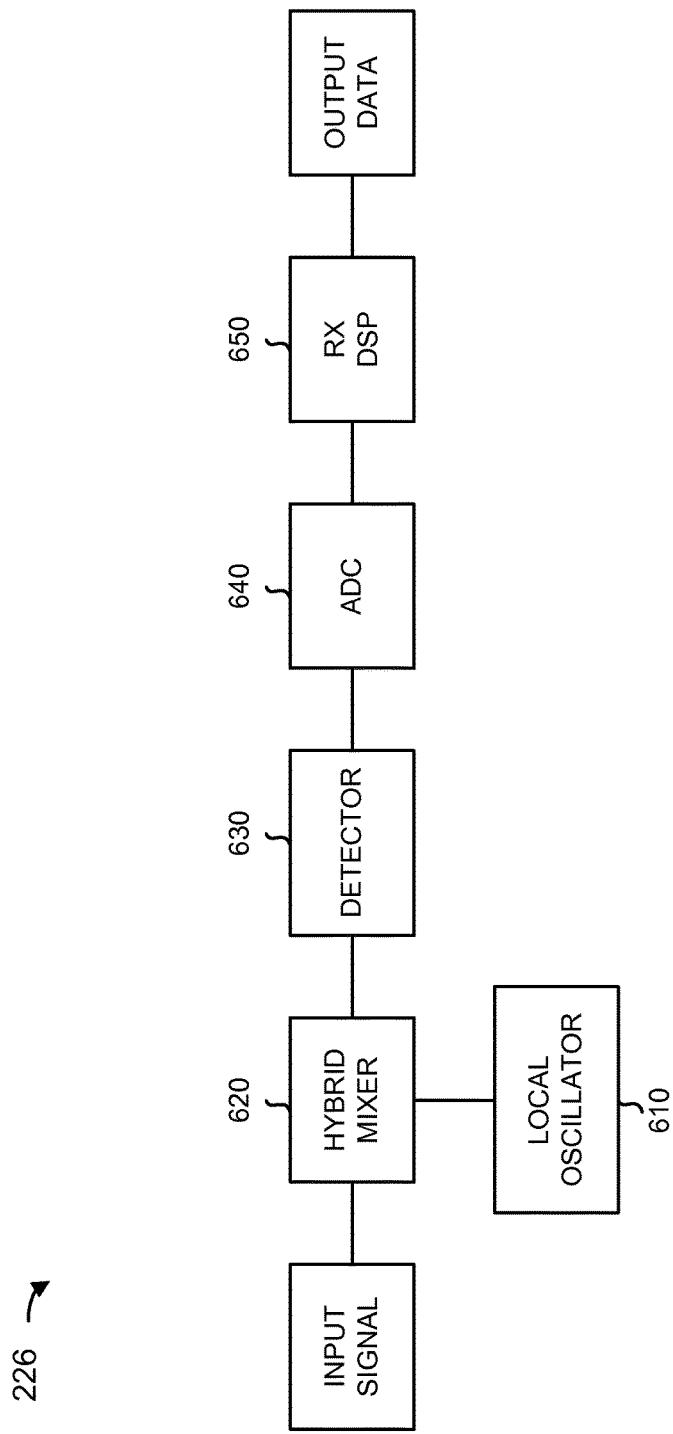
FIG. 6A is a diagram illustrating an example of components of an optical receiver, shown in FIG. 2, according to some implementations.

FIG. 6A is a diagram illustrating an example of components of an optical receiver 226 according to some implementations. As shown in FIG. 6A, optical receiver 226 may include a local oscillator 610, a hybrid mixer 620, a detector 630, an ADC 640, and an RX DSP 650. In some implementations, local oscillator 610, hybrid mixer 620, and detector 630 may be implemented on a single integrated circuit, such as a single PIC. In some implementations, ADC 640 and RX DSP 650 may be implemented using an application specific integrated circuit (ASIC) and/or may be implemented on a single integrated circuit, such as a single PIC. In some other implementations, local oscillator 610, hybrid mixer 620, detector 630, ADC 640, and/or RX DSP 650 may be implemented on one or more integrated circuits, such as one or more PICs. For example, in some example implementations, components of multiple optical receivers 226 may be implemented on a single integrated circuit, such as a single PIC, to form a super-channel receiver.

Local oscillator 610 may include a laser, a collection of lasers, or some other device. In some implementations, local oscillator 610 may include a laser to provide an optical signal to hybrid mixer 620. In some implementations, local oscillator 610 may include a single-sided laser to provide an optical signal to hybrid mixer 620. In some other implementations, local oscillator 610 may include a double-sided laser to provide multiple optical signals to multiple hybrid mixers 620.

Hybrid mixer 620 may include a combiner that receives an optical input signal (e.g., from optical demultiplexer 222) and an optical signal from local oscillator 610 and combines the optical signals to generate an output optical signal. In some implementations, hybrid mixer 620 may split the optical input signal into two, create two orthogonal signals (e.g., by adding the first optical input signal and the optical signal, from local oscillator 610, with zero phase, and by adding the second optical input signal and the optical signal, from local oscillator 610, with 90 degrees phase), and combine the two orthogonal signals for presentation to detector 630.

Detector 630 may include a photodetector, such as a photodiode, to receive the output optical signal, from hybrid mixer 620, and convert the output optical signal to corresponding voltage signals. In some implementations, detector 630 may detect the entire spectrum (e.g., containing all of the subcarriers).

ADC 640 may include an analog-to-digital converter that converts the voltage signals from detector 630 to digital samples. ADC 640 may provide the digital samples to RX DSP 650. RX DSP 650 may receive the digital samples from ADC 640, demultiplex the samples according to the subcarriers, independently process the samples for each of the subcarriers, map the processed samples to produce output data, and output the output data.

While FIG. 6A shows optical receiver 226 as including a particular quantity and arrangement of components, in some implementations, optical receiver 226 may include additional components, fewer components, different components, or differently arranged components. The quantity of detectors 630 and/or ADCs 640 may be selected to implement an optical transmitter 226 that is capable of receiving a polarization diverse signal. In some instances, one of the components illustrated in FIG. 6A may perform a function described herein as being performed by another one of the components illustrated in FIG. 6A.

In other implementations, optical receiver 226 may include intensity-based detectors 630 that operate using on/off keying intensity modulation for each of the subcarriers. In these other implementations, optical receiver 226 may not include a local oscillator 610 or a hybrid mixer 620. Rather, optical receiver 226 may include detector 630, ADC 640, and RX DSP 650, which may operate in a manner similar to that described above.

Figure 6B:
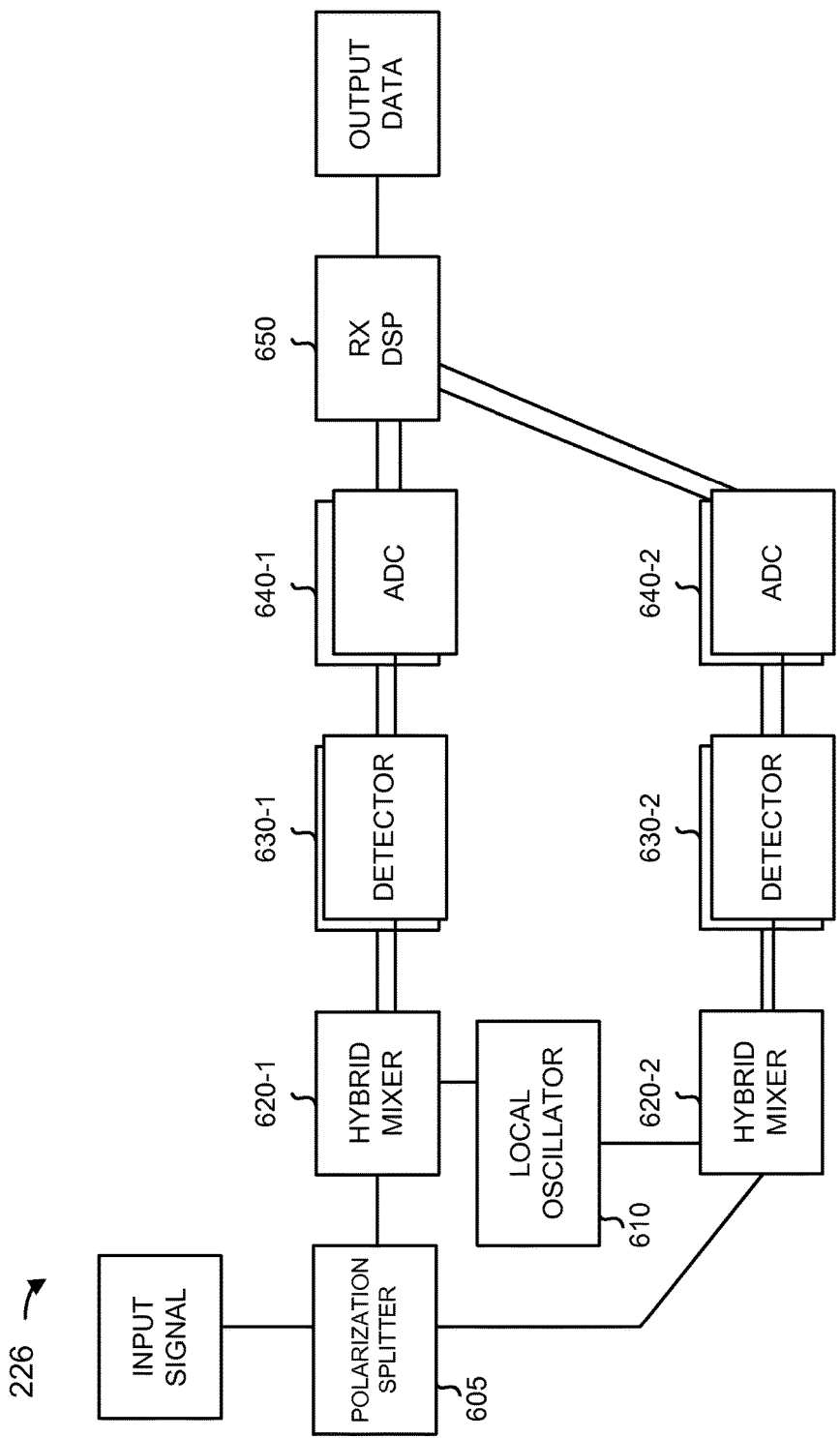
FIG. 6B is a diagram illustrating another example of components of an optical receiver, shown in FIG. 2, according to some implementations.

FIG. 6B is a diagram illustrating another example of components of an optical receiver 226 according to some implementations. As shown in FIG. 6B, optical receiver 226 may include a polarization splitter 605, a local oscillator 610, hybrid mixers 620-1 and 620-2 (referred to generally as hybrid mixers 620 and individually as hybrid mixer 620), detectors 630-1 and 630-2 (referred to generally as detectors 630 and individually as detector 630), ADCs 640-1 and 640-2 (referred to generally as ADCs 640 and individually as ADC 640), and an RX DSP 650. Local oscillator 610, hybrid mixers 620, detectors 630, ADCs 640, and RX DSP 650 may correspond to like components described with regard to FIG. 6A.

Polarization splitter 605 may include a polarization splitter that splits an input signal into two orthogonal polarizations, such as the first polarization and the second polarization. Hybrid mixers 620 may combine the polarization signals with optical signals from local oscillator 610. For example, hybrid mixer 620-1 may combine a first polarization signal with the optical signal from local oscillator 610, and hybrid mixer 620-2 may combine a second polarization signal with the optical signal from local oscillator 610.

Detectors 630 may detect the polarization signals to form corresponding voltage signals, and ADCs 640 may convert the voltage signals to digital samples. For example, two detectors 630-1 may detect the first polarization signals to form the corresponding voltage signals, and a corresponding two ADCs 640-1 may convert the voltage signals to digital samples for the first polarization signals. Similarly, two detectors 630-2 may detect the second polarization signals to form the corresponding voltage signals, and a corresponding two ADCs 640-2 may convert the voltage signals to digital samples for the second polarization signals. RX DSP 650 may process the digital samples for the first and second polarization signals to generate resultant data, which may be outputted as output data.

While FIG. 6B shows optical receiver 226 as including a particular quantity and arrangement of components, in some implementations, optical receiver 226 may include additional components, fewer components, different components, or differently arranged components. The quantity of detectors 630 and/or ADCs 640 may be selected to implement an optical transmitter 226 that is capable of receiving a polarization diverse signal. In some instances, one of the components illustrated in FIG. 6B may perform a function described herein as being performed by another one of the components illustrated in FIG. 6B.

In other implementations, optical receiver 226 may include intensity-based detectors 630 that operate using on/off keying intensity modulation for each of the subcarriers. In these other implementations, optical receiver 226 may not include a local oscillator 610 or a hybrid mixer 620. Rather, optical receiver 226 may include detector 630, ADC 640, and RX DSP 650, which may operate in a manner similar to that described above.

Figure 7:
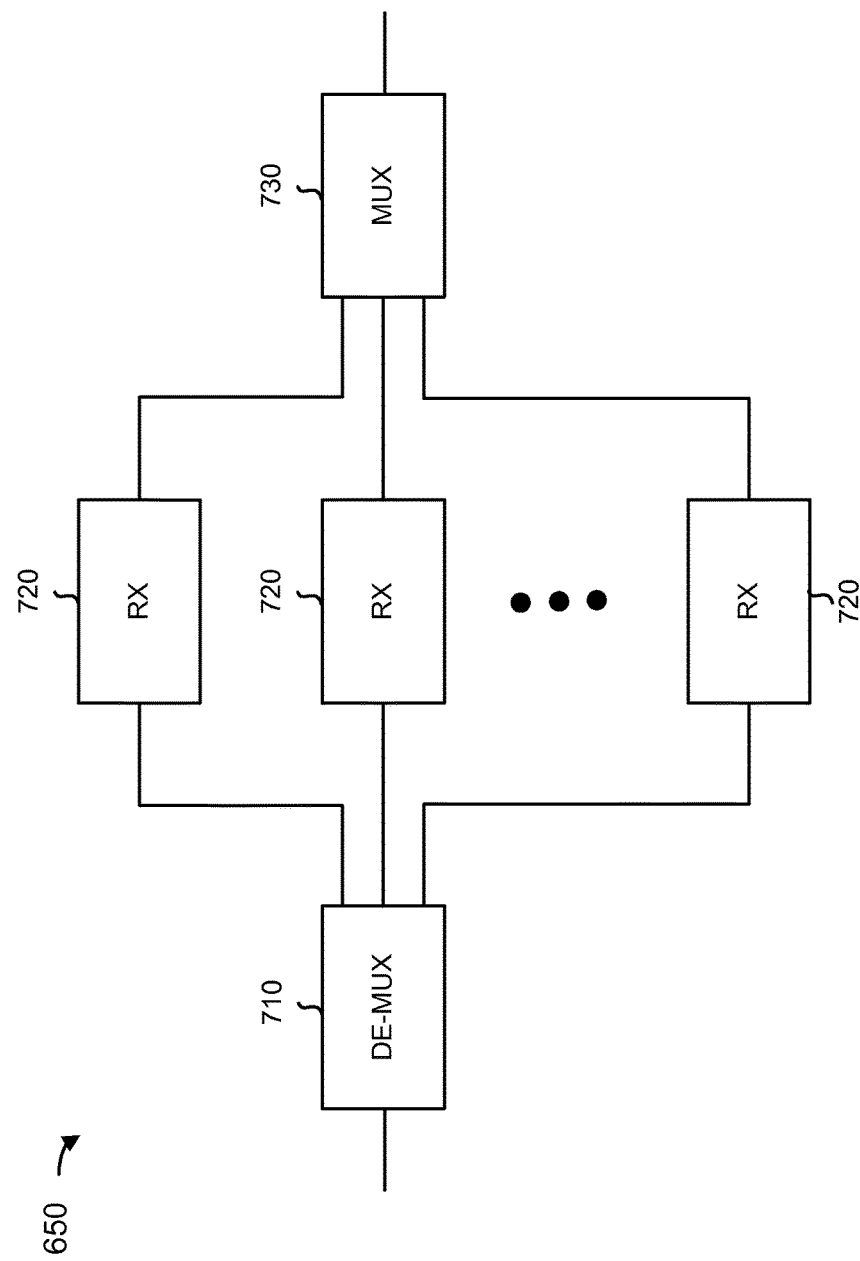
FIG. 7 is a diagram illustrating example components of a receiver DSP shown in FIG. 6A or 6B.

FIG. 7 is a diagram illustrating example components of RX DSP 650. As shown in FIG. 7, RX DSP 650 may include a demultiplexer (DE-MUX) 710, multiple receiver components 720, and a multiplexer (MUX) 730.

Demultiplexer 710 may include a demultiplexer device. Demultiplexer 710 may receive a stream of digital samples from ADC 640, and may demultiplex the digital samples for presentation to receiver components 720.

Receiver components 720 may correspond to a set of Z (Z≥1) receiver components 720, which may correspond to Z subcarriers. In other words, each receiver component 720 may process digital samples, corresponding to a respective subcarrier, to extract the data from the respective subcarrier. Each receiver component 720 may process the digital samples and correct for channel impairments, such as polarization mode dispersion, carrier recovery, or the like. In some implementations, receiver components 720 may de-skew the data to undo skew caused by link 230 or skew introduced by TX DSP 310.

Multiplexer 730 may include a multiplexer device. Multiplexer 730 may receive data for each subcarrier from receiver components 720, and may combine the data to form output data. Multiplexer 730 may de-interleave the data that was systematically interleaved in de-mux component 510 of TX DSP 310 (FIG. 5). Multiplexer 730 may de-skew the data to undo skew caused by link 230 or skew introduced by TX DSP 310.

Error correction may be applied to the data. In some implementations, coding for error correction may be applied at the data source. In some implementations, decoding for error correction, such as FEC decoding, may be applied at the outputs of receiver components 720. In some implementations, decoding for error correction, such as FEC decoding, may be applied at the output of multiplexer 730.

While FIG. 7 shows RX DSP 650 as including a particular quantity and arrangement of components, in some implementations, RX DSP 650 may include additional components, fewer components, different components, or differently arranged components. Also, in some instances, one of the components illustrated in FIG. 7 may perform a function described herein as being performed by another one of the components illustrated in FIG. 7.

Figure 8:
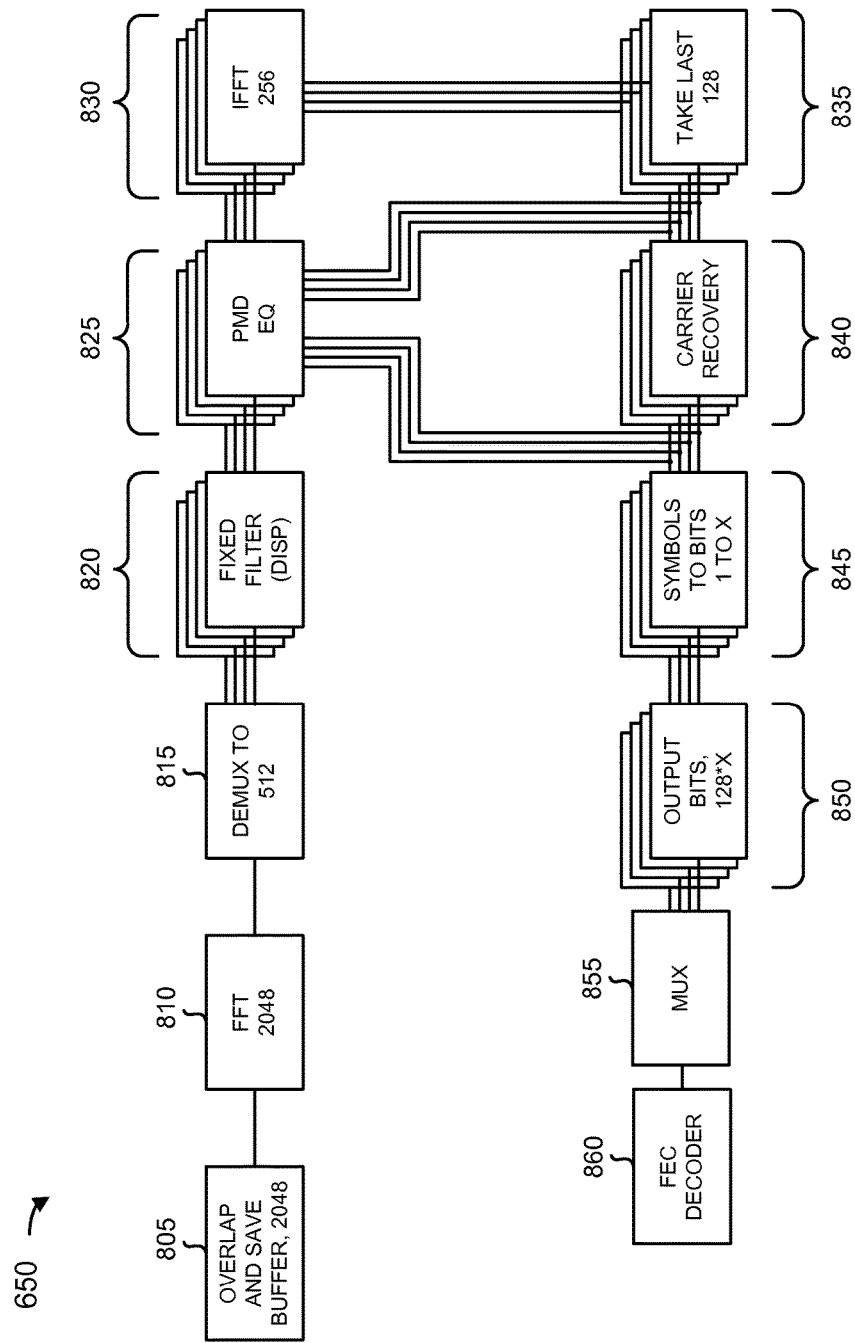
FIG. 8 is a diagram illustrating example components of a receiver DSP shown in FIG. 6A or 6B.

FIG. 8 is a diagram illustrating example functional components of RX DSP 650. The particular functional components, which may be included in RX DSP 650, may vary based on desired performance characteristics and/or computational complexity. For the particular functional components shown in FIG. 8, assume that RX DSP 650 is connected to a 64 GSample/s ADC 640 and detects four subcarriers of eight Gbaud. In this case, RX DSP 650 may include four receiver components 720—one for each subcarrier. RX DSP 650 may include different functional components or a different quantity of functional components in other situations, such as a situation where RX DSP 650 receives signals from four ADCs 640, as shown in FIG. 6B.

As shown in FIG. 8, RX DSP 650 may include an overlap and save buffer 805, FFT component 810, de-mux component 815, fixed filter 820, PMD component 825, IFFT component 830, take last 128 component 835, carrier recovery component 840, symbols to bits component 845, output bits component 850, mux component 855, and FEC decoder 860.

Overlap and save buffer 805 may receive samples from ADC 640. ADC 640 may operate to output samples at 64 GSample/s. Overlap and save buffer 805 may receive 1024 samples and combine the current 1024 samples with the previous 1024 samples, received from ADC 640, to form a vector of 2048 elements. FFT component 810 may receive the 2048 vector elements from overlap and save buffer 805 and convert the vector elements to the frequency domain using, for example, a fast Fourier transform (FFT). FFT component 810 may convert the 2048 vector elements to 2048 frequency bins as a result of performing the FFT.

De-mux component 815 may receive the 2048 frequency bins from FFT component 810. De-mux component 815 may demultiplex the 2048 frequency bins to 512 element vectors for each of the eight Gbaud subcarriers. Fixed filter 820 may apply a filtering operation for, for example, dispersion compensation. Fixed filter 820 may compensate for the relatively slow varying parts of the channel. Fixed filter 840 may also compensate for skew across subcarriers introduced in link 230, or skew introduced intentionally in optical transmitter 212.

PMD component 825 may apply polarization mode dispersion (PMD) equalization to compensate for PMD and polarization rotations. PMD component 825 may also receive and operate based upon feedback signals from take last 128 component 835 and/or carrier recovery component 840.

IFFT component 830 may covert the 512 element vector (after processing by fixed filter component 840 and PMD component 825) back to the time domain as 512 samples. IFFT component 830 may convert the 512 element vector to the time domain using, for example, an inverse fast Fourier transform (IFFT). Take last 128 component 835 may select the last 128 samples from IFFT component 830 and output the 128 samples to carrier recovery component 840.

Carrier recovery component 840 may apply carrier recovery to compensate for transmitter and receiver laser linewidths. In some implementations, carrier recovery component 840 may perform carrier recovery to compensate for frequency and/or phase differences between the transmit signal and the signal from local oscillator 610. After carrier recovery, the data may be represented as symbols in the QPSK constellation. In some implementations, as described above, the output of take last 128 component 835 and/or carrier recovery component 840 could be used to update PMD component 825.

Symbols to bits component 845 may receive the symbols output from carrier recovery component 840 and map the symbols back to bits. For example, symbol to bits component 845 may map one symbol, in the QPSK constellation, to X bits, where X is an integer. For dual-polarization QPSK, X would be four. In some implementations, the bits could be decoded for error correction using, for example, FEC. Output bits component 850 may output 128*X bits at a time. For dual-polarization QPSK, output bits component 850 may output 512 bits at a time.

Mux component 855 may combine the subcarriers together and undo the systematic interleaving introduced in de-mux component 510 of TX DSP 310 (FIG. 5). FEC decoder 860 may process the output of mux component 855 to remove errors using forward error correction.

While FIG. 8 shows RX DSP 650 as including a particular quantity and arrangement of functional components, in some implementations, RX DSP 650 may include additional functional components, fewer functional components, different functional components, or differently arranged functional components.

Figure 9:
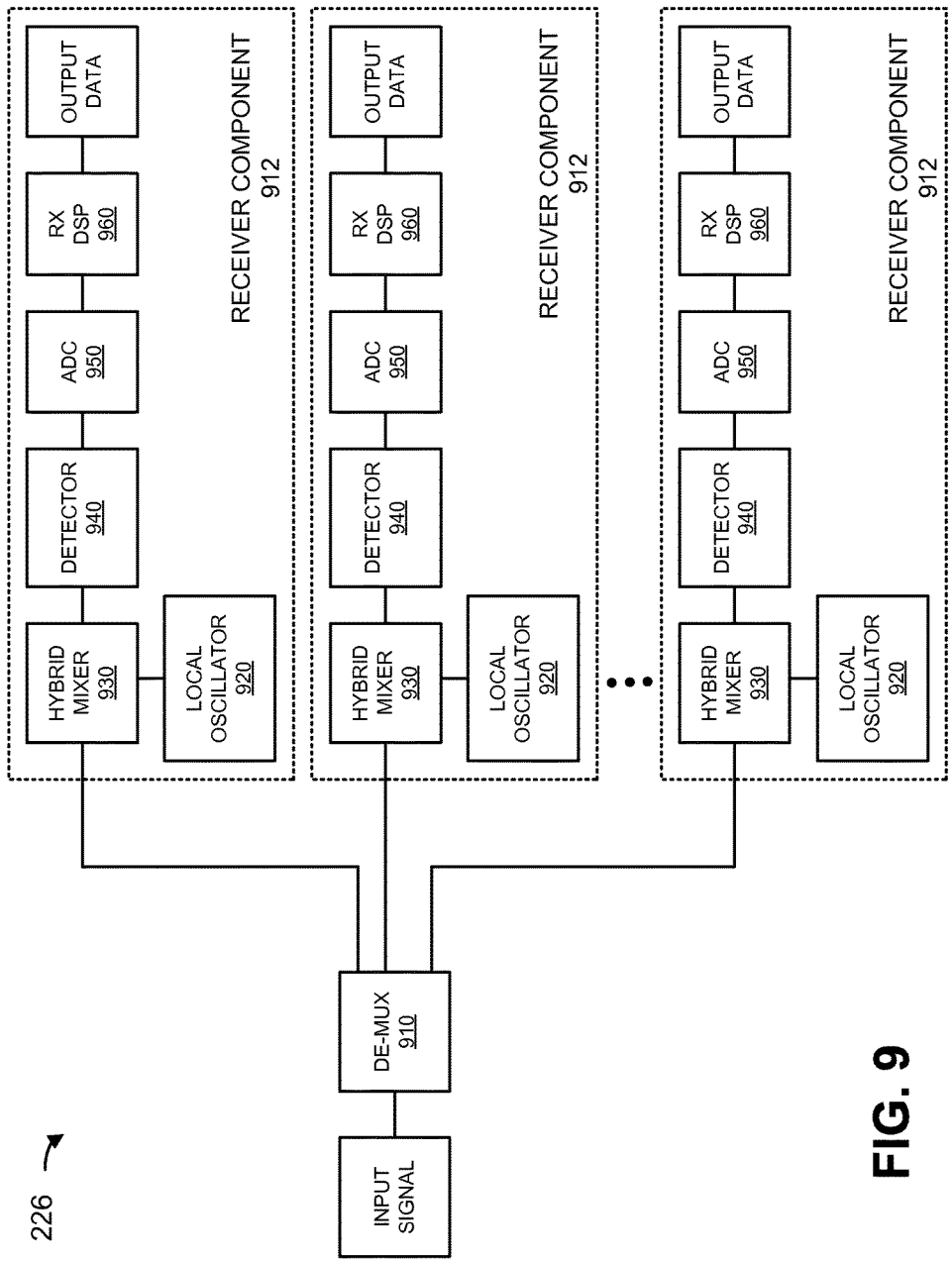
FIG. 9 is a diagram illustrating example components of an optical receiver, shown in FIG. 2, according to some other implementations.

FIG. 9 is a diagram illustrating example components of an optical receiver 226 according to some other implementations. In implementations described with regard to FIG. 6A or 6B, optical receiver 226 processes a whole spectrum of interest and uses digital signal processing to separate out the subcarriers. By contrast, implementations, described with regard to FIG. 9, may optically filter the subcarriers and separately process the subcarriers.

As shown in FIG. 9, optical receiver 226 may include a demultiplexer (DE-MUX) 910 connected to a set of receiver components 912. In some implementations, each receiver component 912 may correspond to a respective one of the subcarriers.

Demultiplexer 910 may include an optical demultiplexer, such as an AWG. Demultiplexer 910 may receive an optical signal, having multiple subcarriers, and separate the optical signal based on the subcarriers. Demultiplexer 910 may provide each subcarrier to a corresponding receiver component 912. Demultiplexer 910 may also provide polarization diversity by separating the input signal into two substantially orthogonal polarizations, such as the first polarization and the second polarization, which may be processed in a manner similar to that described with regard to FIG. 6B.

As shown in FIG. 9, receiver components 912 may include local oscillators 920, hybrid mixers 930, detectors 940, ADCs 950, and RX DSPs 960. In some implementations, local oscillators 920, hybrid mixers 930, and detectors 940 may be implemented on a single integrated circuit, such as a single PIC. In some implementations, ADCs 950 and RX DSPs 960 may be implemented using one or more ASICs and/or may be implemented on one or more integrated circuits, such as one or more PICs. In some other implementations, local oscillators 920, hybrid mixers 930, detectors 940, ADCs 950, and/or RX DSPs 960 may be implemented on one or more integrated circuits, such as one or more PICs.

Local oscillator 920 may include a laser, a collection of lasers, or some other device. In some implementations, local oscillator 920 may include a laser to provide an optical signal to hybrid mixer 930. In some implementations, local oscillator 920 may include a single-sided laser to provide an optical signal to hybrid mixer 930. In some other implementations, local oscillator 920 may include a double-sided laser to provide multiple optical signals to multiple hybrid mixers 930.

Hybrid mixer 930 may include a combiner that receives an optical input signal (e.g., from optical demultiplexer 222) and an optical signal from local oscillator 920 and combines the optical signals to generate an output optical signal. In some implementations, hybrid mixer 930 may split the optical input signal into two, create two orthogonal signals (e.g., by adding the first optical input signal and the optical signal, from local oscillator 920, with zero phase, and by adding the second optical input signal and the optical signal, from local oscillator 920, with 90 degrees phase), and combine the two orthogonal signals for presentation to detector 940.

Detector 940 may include a photodetector, such as a photodiode, to receive the output optical signal, from hybrid mixer 930, and convert the output optical signal to corresponding voltage signals. In some implementations, detector 940 may detect the portion of the spectrum containing the respective subcarrier.

ADC 950 may include an analog-to-digital converter that converts the voltage signals from detector 940 to digital samples. ADC 950 may provide the digital samples to RX DSP 960. RX DSP 960 may receive the digital samples from ADC 950, demultiplex the samples, perform some processing on the samples, and output the resultant data, as output data.

While FIG. 9 shows optical receiver 226 as including a particular quantity and arrangement of components, in some implementations, optical receiver 226 may include additional components, fewer components, different components, or differently arranged components.

Figure 10:
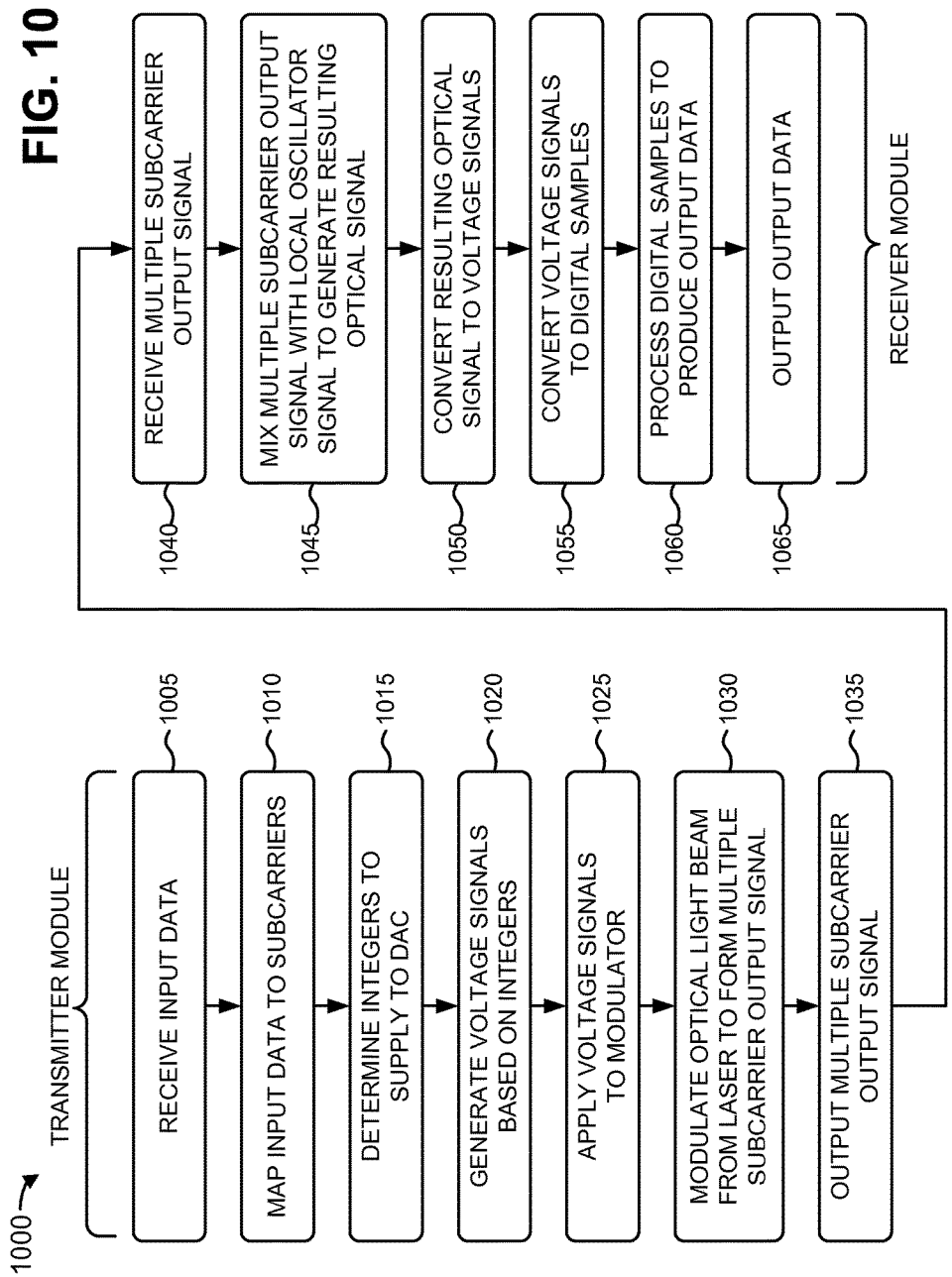
FIG. 10 is a flowchart of an example process that may be performed by a transmitter module and a receiver module of FIG. 2.

FIG. 10 is a flowchart of an example process 1000 that may be performed by transmitter module 210 and receiver module 220. As shown in FIG. 10, a portion of process 1000 may be performed by transmitter module 210 and a portion of process 1000 may be performed by receiver module 220. Process 1000 will be described with corresponding references to FIG. 3A (for operations performed by transmitter module 210) and FIG. 6A (for operations performed by receiver module 220).

Process 1000 may include receiving input data (block 1005). For example, TX DSP 310 may receive input data from a data source. The data source may output one or more streams of data, which may be processed by TX DSP 310.

Process 1000 may include mapping the input data to subcarriers (block 1010) and determining the integers to supply to the DAC (block 1015). For example, TX DSP 310 may determine the signals to apply to modulator 340 to generate multiple subcarriers. TX DSP 310 may receive streams of data, map the streams of data into respective ones of the subcarriers, independently apply spectral shaping to each of the subcarriers, and obtain, based on the spectral shaping of each of the subcarriers, a sequence of assigned integers to supply to DAC 320. TX DSP 310 may also apply forward error correction to the whole stream of data, or apply forward error correction to the subcarriers. TX DSP 310 may also introduce time skew for the subcarriers to compensate for time skew introduced in link 230.

Process 1000 may include generating voltage signals based on the integers (block 1020) and applying the voltage signals to the modulator (block 1025). For example, DAC 320 may receive the sequence of assigned integers and, based on the sequence of assigned integers, generate the voltage signals to apply to modulator 340 using digital-to-analog conversion. DAC 320 may apply the voltage signals to modulator 340.

Process 1000 may include modulating an optical light beam from a laser to form a multiple subcarrier output signal (block 1030) and outputting the multiple subcarrier output signal (block 1035). For example, modulator 340 may receive an optical light beam from laser 330 and the voltage signals from DAC 320, and may modulate the optical light beam to generate a multiple subcarrier output signal. Modulator 340 may output the multiple subcarrier output signal for transmission on link 230.

Process 1000 may include receiving the multiple subcarrier output signal (block 1040) and mixing the multiple subcarrier output signal with a local oscillator signal to generate a resulting optical signal (block 1045). For example, hybrid mixer 620 may receive the multiple subcarrier output signal, which was originally transmitted by transmitter module 210, and an optical signal from local oscillator 610. Hybrid mixer 620 may combine the optical signals to generate a resulting optical signal.

Process 1000 may include converting the resulting optical signal to voltage signals (block 1050). For example, detector 630 may receive the resulting optical signal, from hybrid mixer 620, and convert the resulting optical signal to corresponding voltage signals.

Process 1000 may include converting the voltage signals to digital samples (block 1055). For example, ADC 640 may convert the voltage signals, from detector 630, to digital samples using analog-to-digital conversion.

Process 1000 may include processing the digital samples to produce output data (block 1060) and outputting the output data (block 1065). For example, RX DSP 650 may receive the digital samples from ADC 640, demultiplex the samples according to the subcarriers, independently process the samples for each of the subcarriers, map the processed samples to produce output data, and output the output data. RX DSP 650 may also remove time skew of the subcarriers to compensate for time skew introduced in TX DSP 310 or link 230. RX DSP 650 may perform some kind of de-interleaving to systematically de-interleave the interleaving done in TX DSP 310. RX DSP 650 may perform some kind of forward error correction to either output bits from all subcarriers, or to output bits from the subcarriers individually.

While FIG. 10 shows process 1000 as including a particular quantity and arrangement of blocks, in some implementations, process 1000 may include fewer blocks, additional blocks, or a different arrangement of blocks. Additionally, or alternatively, some of the blocks may be performed in parallel.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
    a digital signal processor including:
        a forward error correction encoder that receives the input stream of data and outputs an encoded stream of data;
        a demultiplexer component, the demultiplexer component receiving the encoded stream of data and outputting a plurality of groups of bits; and
        a plurality of transmitters, each of which including: a respective one of a plurality of fast Fourier transform circuits, and a respective one of a plurality of filter circuits,
            each of the plurality of fast Fourier transform circuits receiving a respective one of a plurality of input symbols, each of the plurality of fast Fourier transform circuits supplying a respective one of a plurality of frequency domain data, each of the plurality of input symbols being indicative of a respective one of the plurality of groups of the bits,
            each of of the plurality of filter circuits receiving a corresponding one of a plurality of inputs, each of the plurality of inputs to the plurality of filter circuits being indicative of a respective one of the plurality of the plurality of frequency domain data, each of the plurality of filter circuits supplying a corresponding one of a plurality of a filter outputs, and
        an inverse fast Fourier transform circuit that operates on data included in the plurality of filter outputs to provide a time domain output,
    a digital-to-analog converter (DAC) circuit that receives a digital input indicative of the time domain output of the inverse fast Fourier transform circuit, the DAC circuit supplying analog outputs;
    a laser that supplies light; and
    a modulator circuit that receives the analog outputs and modulates the light based on the analog outputs to supply an output optical signal that includes a plurality of subcarriers, each of the plurality of subcarriers having a corresponding one of a plurality of frequency spectra, such that each of the plurality of frequency spectra does not overlap with one another in frequency, wherein the plurality of subcarriers is provided to an optical link, the digital signal processor introducing a timing skew among the plurality of subcarriers to correct skew induced by the optical link.

2. A system in accordance with claim 1, wherein, the digital signal processor further including a multiplexer component that receives the plurality of filter outputs and supplies the data to the inverse fast Fourier transform circuit, the timing skew being introduced by at least one of the multiplexer component, the demultiplexer component, and the plurality of transmitters.

3. A system in accordance with claim 1, wherein the digital signal processor and the DAC circuit are implemented as an application specific integrated circuit.

4. A system in accordance with claim 1, further including a photonic integrated circuit, the laser and the modulator circuit being included in the photonic integrated circuit.

5. A system in accordance with claim 1, wherein the digital signal processor further including a multiplexer component that receives the plurality of filter outputs and supplies the data to the inverse fast Fourier transform circuit.

6. A system in accordance with claim 1, further comprising:
 a receiver including:
  a detector,
  a local oscillator configured to generate a local oscillator signal,
  a mixer configured to:
  receive the local oscillator signal from the local oscillator and the output optical signal, and combine the local oscillator signal and the output optical signal to generate a resulting optical signal, and output the resulting optical signal to the detector, the detector providing a set of voltage signals based on the resulting optical signal,
  an analog-to-digital converter configured to:
  receive the set of voltage signals from the detector, and generate digital samples based on the set of voltage signals; and
  a receiver processor configured to:
  receive the digital samples from the analog-to-digital converter, process the digital samples to produce output data, and output the output data.

7. A system in accordance with claim 1, wherein the plurality of filter circuits is configured to determine a corresponding one of a plurality of spectra, such that each of the plurality of subcarriers has a respective one of the plurality of spectra.

8. A system, comprising:
 an analog to digital converter circuit that receives a voltage signal and outputs a plurality of samples, the voltage signal corresponding to an optical signal having a plurality of subcarriers, each of the plurality of subcarriers having a corresponding one of a plurality of frequency spectra, such that each of the plurality of frequency spectra does not overlap with one another in frequency; and
 a digital signal processor that receives the first plurality of samples, the digital signal processor including:
  a fast Fourier transform (FFT) circuit that receives the plurality of samples and supplies a frequency domain FFT output,
  a demultiplexer that receives the frequency domain FFT output and provides demultiplexer outputs,
  a plurality of filter circuits, each of which receiving a corresponding one of filter inputs, the plurality of filter inputs being based on the demultiplexer outputs, each of the plurality of filter circuits supplying a corresponding one of a plurality of filter outputs, and
  a plurality of inverse fast Fourier transform (IFFT) circuits, each of which receiving a respective one of a plurality of IFFT inputs, each of the plurality of IFFT inputs being indicative of a corresponding one of the filter outputs, each of the plurality of IFFT circuits supplying a respective one of IFFT outputs,
  wherein the plurality of subcarriers propagate over an optical link, the digital signal processor introducing a de-skew that corrects skew induced by the optical link or from a digital signal processor provided in a transmitter that outputs the optical signal.

9. A system in accordance with claim 8, wherein a number of the plurality of inverse fast Fourier transform circuits is equal to a number of the plurality of subcarriers.

10. A system in accordance with claim 8, further including a symbol to bits component that receives symbols indicative of the IFFT outputs, the symbol to bits component outputting bits corresponding to symbols.

11. A system in accordance with claim 10, further including a multiplexer that receives inputs indicative of the bits.

12. A system in accordance with claim 11, further including a forward error correction decoder that receives an output of the multiplexer.

13. A system in accordance with claim 8, further including:
 a local oscillator that supplies an optical output;
 a hybrid mixer that receives and mixes the optical output of the local oscillator and the optical signal; and
 a detector circuit that receives the optical signal and generates the voltage signal.

14. A system in accordance with claim 8, further including a polarization mode dispersion (PMD) equalization component that applies PMD equalization to one of the plurality of filter outputs.

15. A system in accordance with claim 14, wherein the PMD equalized plurality of filter outputs are supplied as the plurality of IFFT inputs.

16. A system in accordance with claim 8, further including carrier recovery circuits, that receive carrier recovery inputs indicative of the IFFT outputs, the carrier recovery circuits compensating phase and frequency differences between the optical output of the local oscillator and the optical signal including the plurality of subcarriers.

17. A system in accordance with claim 8, wherein a number of the plurality of fast Fourier transform circuits is equal to a number of the plurality of subcarriers.

18. A system in accordance with claim 8, wherein the digital signal processor includes:
 a plurality of receivers, each of which including a respective one of the plurality of filter circuits and a respective one of the plurality of IFFT circuits; and
 a multiplexer that receives a plurality of multiplexer inputs, each of which being indicative of a corresponding one of the plurality of IFFT outputs,
 wherein the de-skew is introduced by at least one of (i) the plurality of receivers and (ii) the multiplexer.

19. A system, comprising:
 a digital signal processor that receives an input stream of data, the digital signal processor including:
  a forward error correction encoder that receives the input stream of data and outputs an encoded stream of data;

a demultiplexer component receiving the encoded stream of data and outputting a plurality of groups of bits, the demultiplexer component having a plurality of outputs;

a plurality of bits-to-symbol circuits, each of which being coupled to a respective one of the plurality of outputs of the demultiplexer component, each of the plurality of bits-to-symbol circuits providing a respective one of a plurality of symbols based on a corresponding one of the plurality of groups of bits;

a plurality of buffer circuits, each of which receiving a corresponding one of the plurality of symbols, each of the plurality of buffer circuits storing a respective one of the plurality of the plurality of symbols;

a plurality of fast Fourier transform circuits, each of which receiving a respective one of a plurality of symbols output from a respective one of the plurality of buffer circuits, each of the plurality of fast Fourier transform circuits supplying frequency domain data;

a plurality of replicator circuits that receive and replicate the frequency domain data;

a plurality of filter circuits that receive the replicated frequency domain data, each of the plurality of filter circuits supplying a corresponding one of a plurality of a filter outputs, a multiplexer component that combines the plurality of filter outputs and supplies a multiplexer output; and an inverse fast Fourier transform circuit that operates on the multiplexer output to supply a time domain output, a digital-to-analog converter (DAC) circuit that receives a digital input indicative of the time domain output of the inverse fast Fourier transform circuit, the DAC circuit supplying analog outputs;

a laser that supplies light; and a modulator circuit that receives the analog outputs and modulates the light based on the analog outputs to supply an output optical signal that includes a plurality of subcarriers, each of the plurality of subcarriers having a corresponding one of a plurality of frequency spectra, such that each of the plurality of frequency spectra does not overlap with one another in frequency, wherein the plurality of subcarriers is provided to an optical link, the digital signal processor introducing a timing skew that corrects skew induced by the optical link.

20. A system, comprising:

an analog to digital converter circuit that receives a voltage signal and outputs a plurality of samples, the input signal corresponding to an optical signal having a plurality of subcarriers, each of the plurality of subcarriers having a corresponding one of a plurality of frequency spectra, such that each of the plurality of frequency spectra does not overlap with one another in frequency; and a digital signal processor that receives the first plurality of samples, the digital signal processor including:

a fast Fourier transform (FFT) circuit that receives the plurality of samples and supplies a frequency domain FFT output, a demultiplexer that receives the frequency domain FFT output and provides demultiplexer outputs, a plurality of filter circuits, each of which receiving a corresponding one of filter inputs, the plurality of filter inputs being based on the demultiplexer outputs, each of the plurality of filter circuits supplying a corresponding one of a plurality of filter outputs, a plurality of polarization mode dispersion (PMD) equalization circuits, each of which applying PMD equalization to a corresponding one of the plurality of filter outputs;

a plurality of inverse fast Fourier transform (IFFT) circuits, each of which receiving a respective one of a plurality of IFFT inputs, each of the plurality of IFFT inputs being indicative of an output of a respective one of the plurality of PMD equalization circuits, each of the plurality of IFFT circuits supplying a respective one of IFFT outputs;

a take-last circuit that selects a subset of the IFFT outputs;

a plurality of carrier recovery circuits, each of which supplying a corresponding one of a plurality of a plurality of symbols based one a corresponding IFFT output of the selected subset of IFFT outputs;

a plurality of symbols-to-bits circuits, each of which receiving a respective one of the plurality of symbols and supplying a corresponding one of a plurality of groups of bits;

a multiplexer that combines the plurality of groups of bits at an output; and a forward error correction (FEC) decoder that receives the plurality of groups of bits output from the multiplexer and outputs decoded data, wherein the plurality of subcarriers propagate on an optical link, the digital signal processor introducing a de-skew that corrects skew induced by the optical link or from a digital signal processor provided in a transmitter that outputs the optical signal.

21. A system, comprising:

a digital signal processor that receives an input stream of data, the digital signal processor including:

a forward error correction encoder that receives the input stream of data and outputs an encoded stream of data;

a demultiplexer component, the demultiplexer component receiving the encoded stream of data and outputting a plurality of groups of bits;

a plurality of fast Fourier transform circuits, each of which receiving a respective one of a plurality of input symbols, each of the plurality of fast Fourier transform circuits supplying a respective one of a plurality of frequency domain data, each of the plurality of input symbols being indicative of a respective one of the plurality of groups of the bits;

a plurality of filter circuits, each of which receiving a corresponding one of a plurality of inputs, each of the plurality of inputs to the plurality of filter circuits being indicative of a respective one of the plurality of the plurality of frequency domain data, each of the plurality of filter circuits supplying a corresponding one of a plurality of a filter outputs, and an inverse fast Fourier transform circuit that operates on data included in the plurality of filter outputs to provide a time domain output, a digital-to-analog converter (DAC) circuit that receives a digital input indicative of the time domain output of the inverse fast Fourier transform circuit, the DAC circuit supplying analog outputs;

a laser that supplies light; and a modulator circuit that receives the analog outputs and modulates the light based on the analog outputs to supply an output optical signal including a plurality of subcarriers, such that the output optical signal is provided to an optical fiber, each of the plurality of subcarriers output to the optical fiber has a corresponding one of a plurality of frequency spectra that do not overlap with one another in frequency.

22. A receiver, comprising:
an analog to digital converter circuit that receives a voltage signal and outputs a plurality of samples, the voltage signal corresponding to an optical signal that is input to an optical fiber, the optical signal including a plurality of subcarriers, such that the optical signal is transmitted on the optical fiber, each of the plurality of subcarriers input to the optical fiber has a corresponding one of a plurality of frequency spectra that do not overlap with one another in frequency; and
a digital signal processor that receives the first plurality of samples, the digital signal processor including:
  a fast Fourier transform (FFT) circuit that receives the plurality of samples and supplies a frequency domain FFT output,
  a demultiplexer that receives the frequency domain FFT output and provides demultiplexer outputs,
  a plurality of filter circuits, each of which receiving a corresponding one of filter inputs, the plurality of filter inputs being based on the demultiplexer outputs, each of the plurality of filter circuits supplying a corresponding one of a plurality of filter outputs, and
a plurality of inverse fast Fourier transform (IFFT) circuits, each of which receiving a respective one of a plurality of IFFT inputs, each of the plurality of IFFT inputs being indicative of a corresponding one of the filter outputs, each of the plurality of IFFT circuits supplying a respective one of IFFT outputs.

23. A system, comprising:
a digital signal processor that receives an input stream of data, the digital signal processor including:
  a forward error correction encoder that receives the input stream of data and outputs an encoded stream of data;
  a demultiplexer component receiving the encoded stream of data and outputting a plurality of groups of bits, the demultiplexer component having a plurality of outputs;
  a plurality of bits-to-symbol circuits, each of which being coupled to a respective one of the plurality of outputs of the demultiplexer component, each of the plurality of bits-to-symbol circuits providing a respective one of a plurality of symbols based on a corresponding one of the plurality of groups of bits;
  a plurality of buffer circuits, each of which receiving a corresponding one of the plurality of symbols, each of the plurality of buffer circuits storing a respective one of the plurality of the plurality of symbols;
  a plurality of fast Fourier transform circuits, each of which receiving a respective one of a plurality of symbols output from a respective one of the plurality of buffer circuits, each of the plurality of fast Fourier transform circuits supplying frequency domain data;
  a plurality of replicator circuits that receive and replicate the frequency domain data;
  a plurality of filter circuits that receive the replicated frequency domain data, each of the plurality of filter circuits supplying a corresponding one of a plurality of a filter outputs,
  a multiplexer component that combines the plurality of filter outputs and supplies a multiplexer output; and
  an inverse fast Fourier transform circuit that operates on the multiplexer output to supply a time domain output,
a digital-to-analog converter (DAC) circuit that receives a digital input indicative of the time domain output of the inverse fast Fourier transform circuit, the DAC circuit supplying analog outputs;
a laser that supplies light; and
a modulator circuit that receives the analog outputs and modulates the light based on the analog outputs to supply an output optical signal including a plurality of subcarriers, such that the output optical signal is provided to an optical fiber, each of the plurality of subcarriers output to the optical fiber has a corresponding one of a plurality of frequency spectra that do not overlap with one another in frequency.

24. A receiver, comprising:
an analog to digital converter circuit that receives a voltage signal and outputs a plurality of samples, the voltage signal corresponding to an optical signal that is input to an optical fiber, the optical signal including a plurality of subcarriers, such that the optical signal is transmitted on the optical fiber, each of the plurality of subcarriers input to the optical fiber has a corresponding one of a plurality of frequency spectra that do not overlap with one another in frequency; and
a digital signal processor that receives the first plurality of samples, the digital signal processor including:
  a fast Fourier transform (FFT) circuit that receives the plurality of samples and supplies a frequency domain FFT output,
  a demultiplexer that receives the frequency domain FFT output and provides demultiplexer outputs,
  a plurality of filter circuits, each of which receiving a corresponding one of filter inputs, the plurality of filter inputs being based on the demultiplexer outputs, each of the plurality of filter circuits supplying a corresponding one of a plurality of filter outputs,
  a plurality of polarization mode dispersion (PMD) equalization circuits, each of which applying PMD equalization to a corresponding one of the plurality of filter outputs;
  a plurality of inverse fast Fourier transform (IFFT) circuits, each of which receiving a respective one of a plurality of IFFT inputs, each of the plurality of IFFT inputs being indicative of an output of a respective one of the plurality of PMD equalization circuits, each of the plurality of IFFT circuits supplying a respective one of IFFT outputs;
  a take-last circuit that selects a subset of the IFFT outputs;
  a plurality of carrier recovery circuits, each of which supplying a corresponding one of a plurality of a plurality of symbols based one a corresponding IFFT output of the selected subset of IFFT outputs;
  a plurality of symbols-to-bits circuits, each of which receiving a respective one of the plurality of symbols and supplying a corresponding one of a plurality of groups of bits;
  a multiplexer that combines the plurality of groups of bits at an output; and
  a forward error correction (FEC) decoder that receives the plurality of groups of bits output from the multiplexer and outputs decoded data.

\* \* \* \* \*